United States Patent
Yeo et al.

(10) Patent No.: US 12,388,099 B2
(45) Date of Patent: Aug. 12, 2025

(54) APPARATUS FOR SENSING VOLTAGE INFORMATION OF FUEL CELL

(71) Applicant: HYUNDAI MOBIS CO., LTD., Seoul (KR)

(72) Inventors: Yeong-Geun Yeo, Seoul (KR); Jung-Hwan Oh, Siheung-si (KR); Su-Hun Yang, Seoul (KR); Seulkirom Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 13 days.

(21) Appl. No.: 18/525,010

(22) Filed: Nov. 30, 2023

(65) Prior Publication Data

US 2024/0105977 A1    Mar. 28, 2024

Related U.S. Application Data

(62) Division of application No. 16/952,429, filed on Nov. 19, 2020, now Pat. No. 11,870,112.

(30) Foreign Application Priority Data

Nov. 22, 2019 (KR) .................. 10-2019-0151514
Dec. 4, 2019 (KR) .................. 10-2019-0159546

(51) Int. Cl.
*H01M 8/04537*    (2016.01)

(52) U.S. Cl.
CPC ... *H01M 8/04559* (2013.01); *H01M 8/04619* (2013.01); *H01M 2250/20* (2013.01)

(58) Field of Classification Search
CPC ......... H01M 8/04552; H01M 8/04559; H01M 8/04611; H01M 8/04619; H01M 8/04664;
(Continued)

(56) References Cited

U.S. PATENT DOCUMENTS

| | | | |
|---|---|---|---|
| 2016/0091570 A1* | 3/2016 | Park | H01M 8/04589 324/426 |
| 2017/0054162 A1 | 2/2017 | Rouveyre | |

(Continued)

FOREIGN PATENT DOCUMENTS

| | | |
|---|---|---|
| JP | H11-273702 A | 10/1999 |
| JP | 2008-004432 A | 1/2008 |

(Continued)

OTHER PUBLICATIONS

U.S. Notice of Allowance dated Aug. 30, 2023 issued in U.S. Appl. No. 16/952,429.

(Continued)

*Primary Examiner* — Christopher P Domone
(74) *Attorney, Agent, or Firm* — Morgan, Lewis & Bockius LLP

(57) ABSTRACT

An apparatus for sensing voltage information of a fuel cell includes: a sensing unit configured to sense voltages of each cell and all cells included in a fuel cell; a controller configured to control the sensing unit to sense the voltages of each cell and all the cells of the fuel cell according to a command of an upper controller, or to transmit information of the sensed voltages of each cell and all the cells to the upper controller; and the upper controller configured to detect an error cell by calculating output power of the fuel cell based on the information of the voltages received from the controller, to substantially prevent damage to a surrounding cell by stopping an operation of the error cell, and to control the output power in real time in correspondence with a state of the fuel cell.

7 Claims, 10 Drawing Sheets

(58) Field of Classification Search
CPC ......... H01M 8/04671; H01M 8/04679; H01M 8/04313
See application file for complete search history.

(56) References Cited

U.S. PATENT DOCUMENTS

2018/0108925 A1* 4/2018 Won .................... H01M 8/2457
2018/0323454 A1* 11/2018 Yamane ............ H01M 8/04992

FOREIGN PATENT DOCUMENTS

| | | |
|---|---|---|
| JP | 2011-222194 A | 11/2011 |
| JP | 2014-060116 A | 4/2014 |
| KR | 10-2016-0036422 A | 4/2016 |
| KR | 10-2018-0042745 A | 4/2018 |
| KR | 10-1870520 B1 | 6/2018 |

OTHER PUBLICATIONS

Korean Office Action issued on Jan. 4, 2021 from the corresponding Korean Application No. 10-2019-0151514, 6 pp.
Korean Office Action issued on Jan. 14, 2021 from the corresponding Korean Application No. 10-2019-0159546, 5 pp.

* cited by examiner

FIG.2 "PRIOR ART"
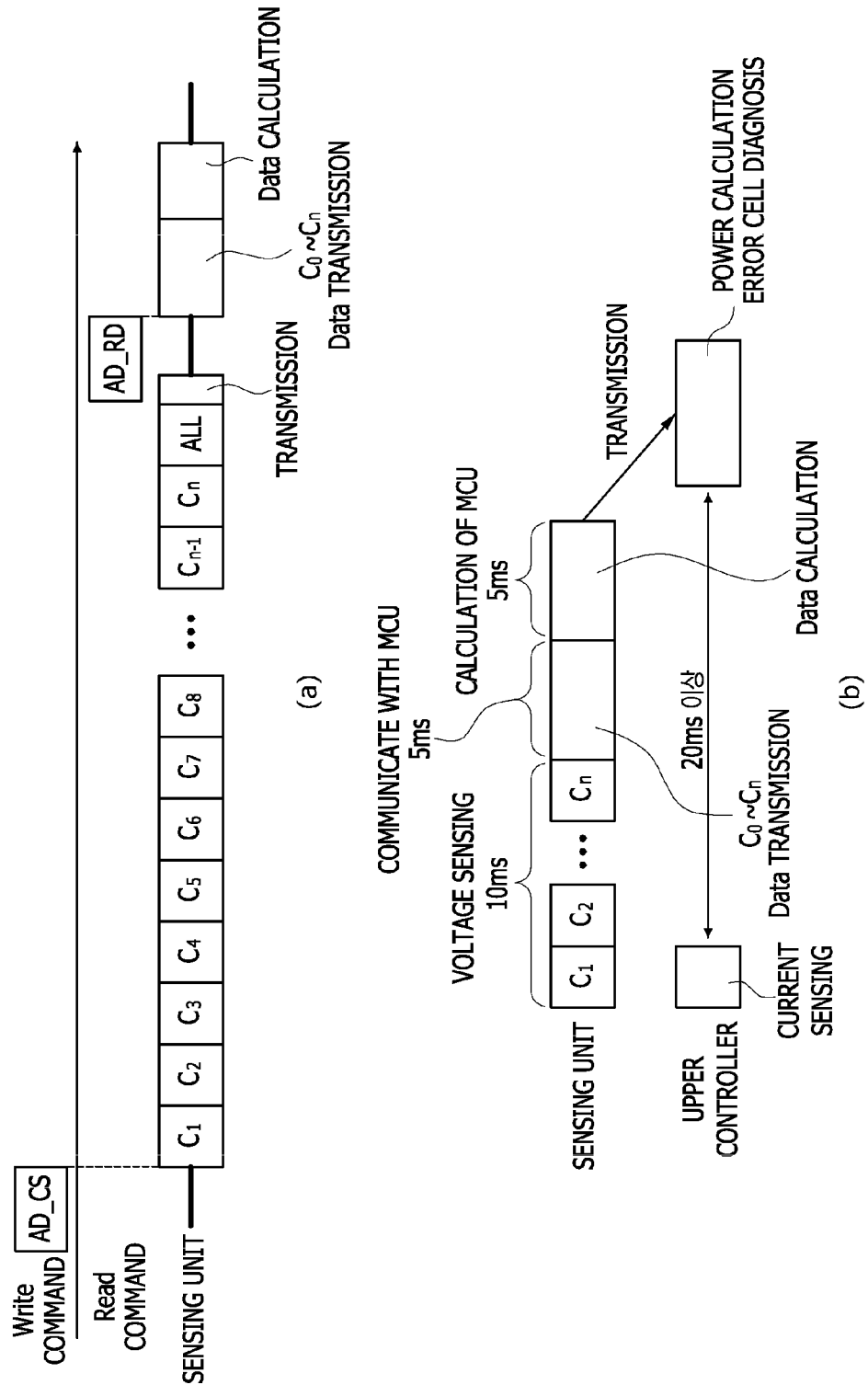

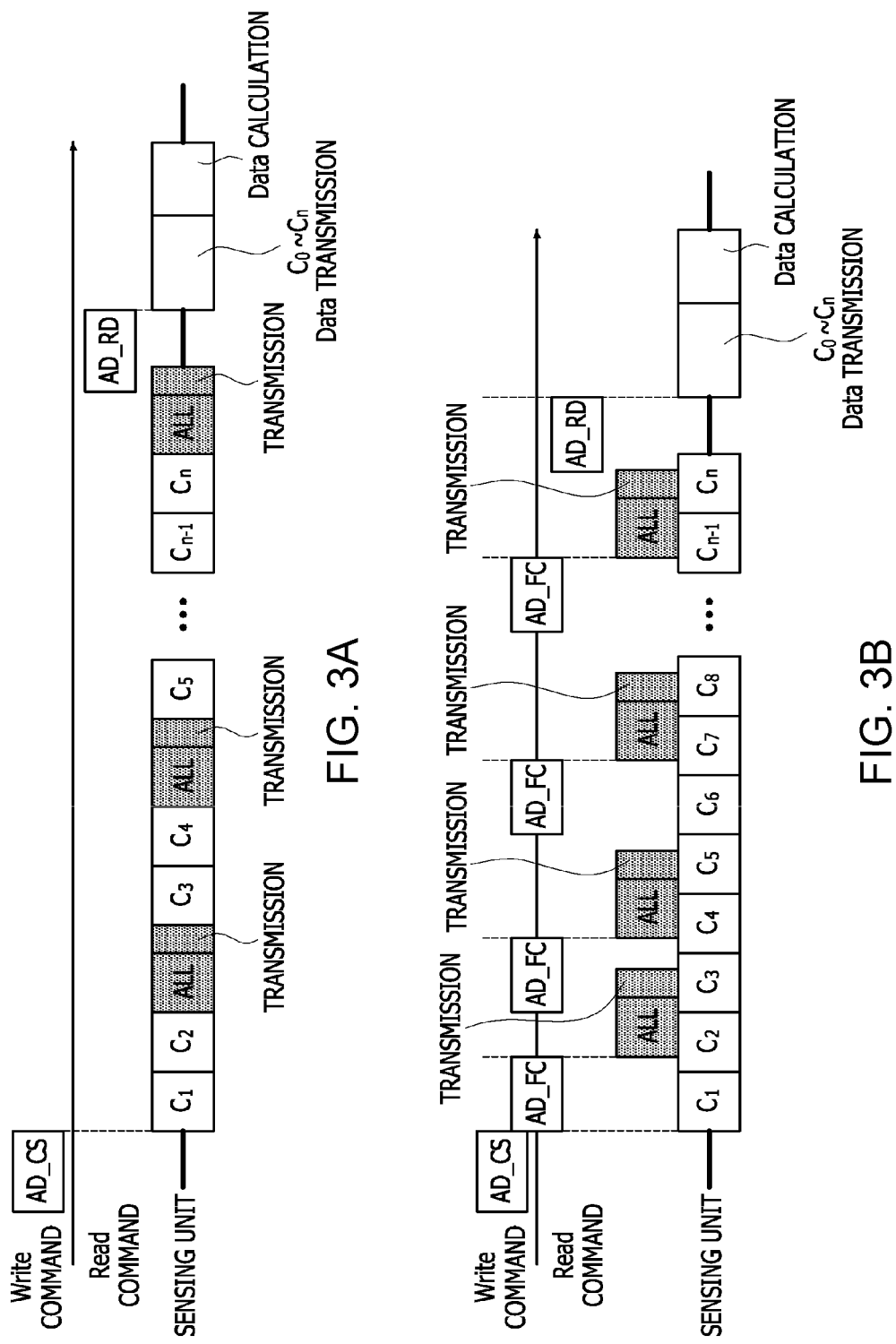

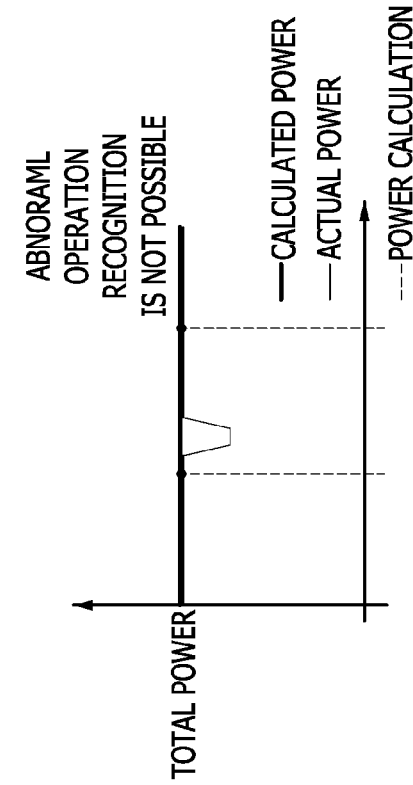
FIG. 4A "PRIOR ART"
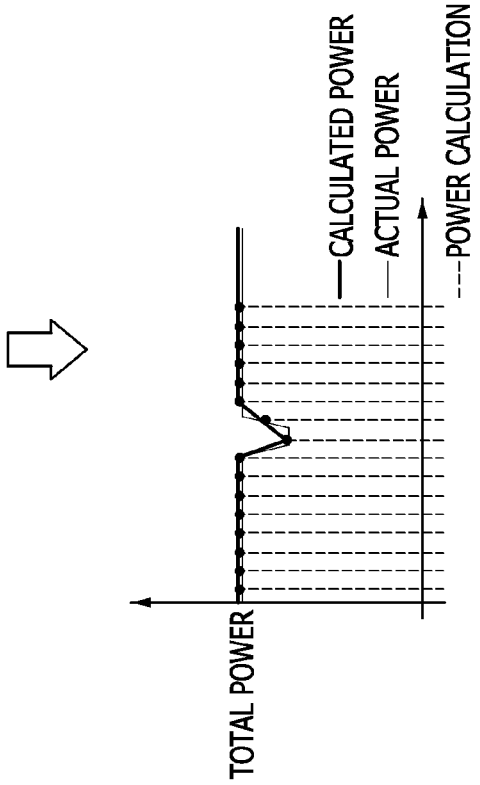
FIG. 4C "PRIOR ART"
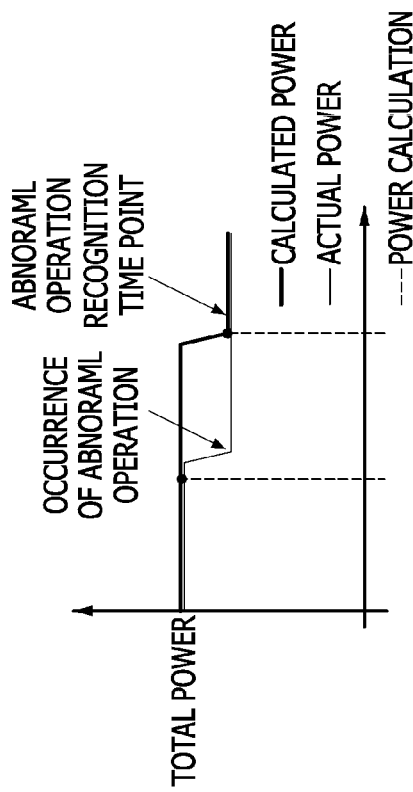
FIG. 4B
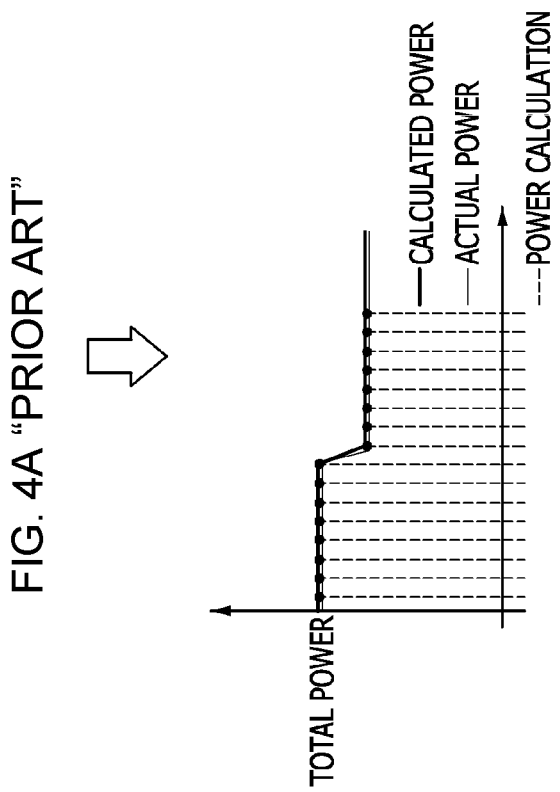
FIG. 4D FIG.6
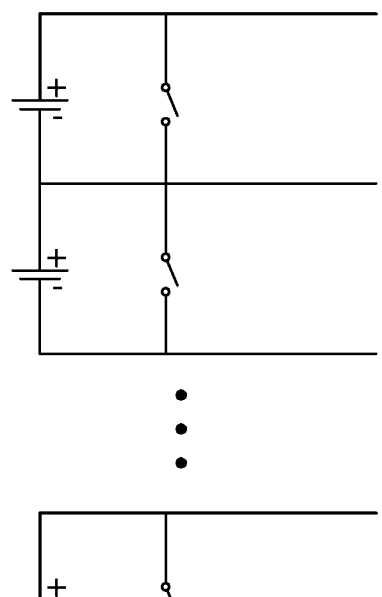
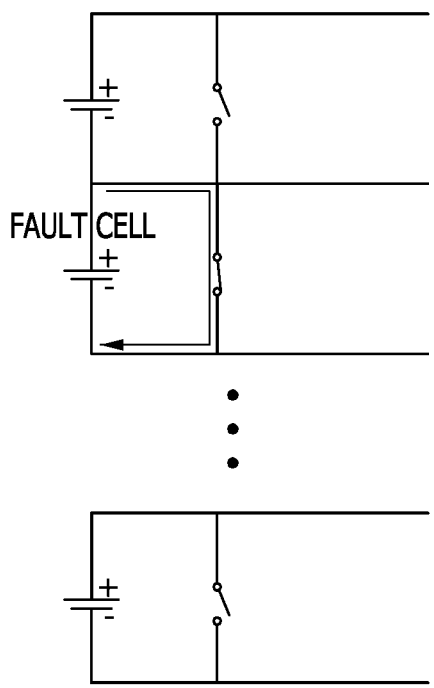
(a) NORMAL DRIVING          (b) OCCURRENCE OF Fault

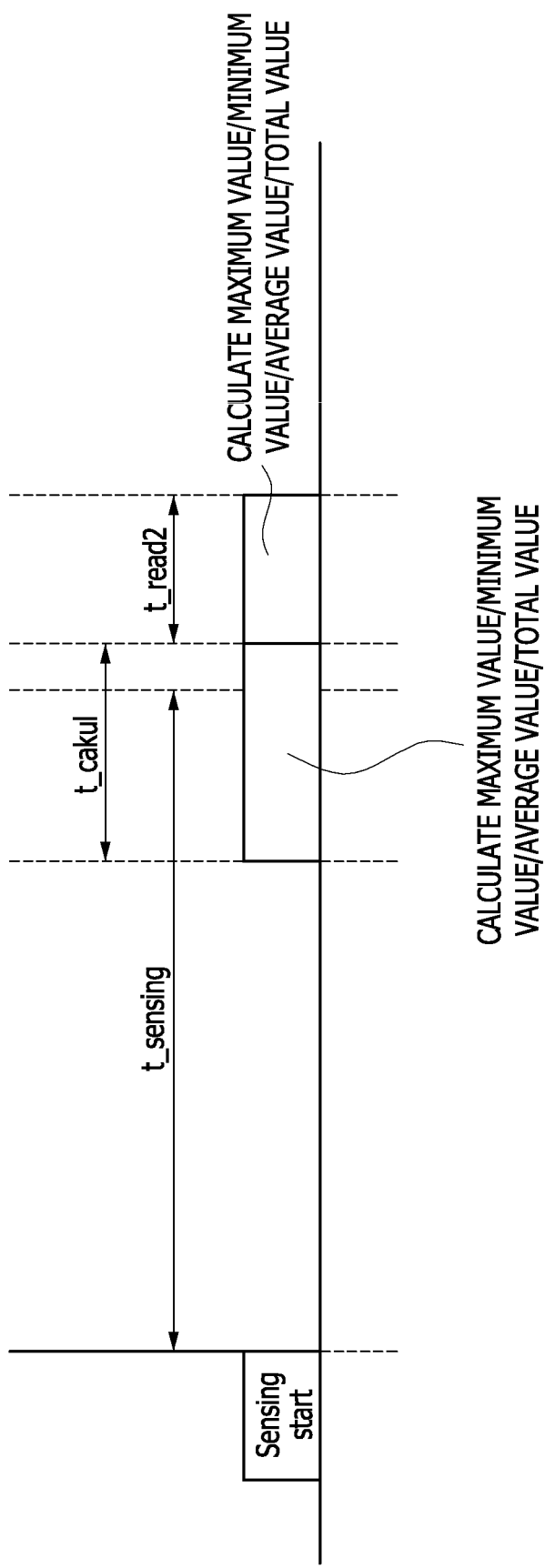

APPARATUS FOR SENSING VOLTAGE INFORMATION OF FUEL CELL

CROSS-REFERENCE TO RELATED APPLICATIONS

This application is a divisional patent application of U.S. patent application Ser. No. 16/952,429, filed on Nov. 19, 2020, which claims priority to and the benefit of Korean Patent Application No. 10-2019-0151514, filed on Nov. 22, 2019, and Korean Patent Application No. 10-2019-0159546, filed on Dec. 4, 2019, the entire contents of which are hereby incorporated by reference.

FIELD

The present disclosure relates to an apparatus for sensing voltage information of a fuel cell, which is capable of acquiring information of a fuel cell for accurately controlling the fuel cell.

BACKGROUND

The statements in this section merely provide background information related to the present disclosure and may not constitute prior art.

In general, a polymer electrolyte membrane fuel cell includes a membrane electrode assembly (MEA) having a catalyst electrode layer in which an electrochemical reaction occurs and which is attached to either side of a solid polymer electrolyte membrane through which hydrogen ions move, a gas diffusion layer (GDL) that serves to uniformly distribute reaction gases and transmit generated electric energy, a gasket and a fastener for maintaining airtightness and proper fastening pressure of the reaction gases and coolant, and a bipolar plate that moves the reaction gases and the coolant.

When a fuel cell stack is assembled using such a unit cell configuration, a combination of the membrane electrode assembly and the gas diffusion layer, which are main components, is located on the innermost side of the unit cell. The membrane electrode assembly has the catalyst electrode layers coated with a catalyst and attached to both sides of the solid polymer electrolyte membrane such that hydrogen and oxygen may react, that is, an anode and a cathode, and the gas diffusion layer, the gasket and the like are stacked on an outer part where the anode and the cathode are positioned.

Outside of the gas diffusion layer, the bipolar plate, which is provided with a flow field through which reaction gases (hydrogen as fuel and oxygen or air as an oxidant) are supplied and the coolant passes, is located. With such a configuration as a unit cell, a plurality of unit cells are stacked, a current collector, an insulating plate, and end plates for supporting the stacked cells are coupled to the outermost side of the unit cells, and the unit cells are repeatedly stacked and fastened between the end plates, so that the fuel cell stack is configured.

In order to actually obtain a potential required in a vehicle, a necessary number of unit cells corresponding to the required potential need to be stacked to construct the stack. The potential generated in one unit cell is about 1.3 V, and a plurality of cells are serially stacked to produce power required for driving the vehicle. Accordingly, when performance degradation or failure occurs in any one of the unit cells constituting the fuel cell stack, the entire performance of the fuel cell stack is degraded, resulting in a phenomenon in which a stable operation is not provided.

In such a case, the output voltage and current of the fuel cell are not constant and are controlled to change every moment according to the required power. Thus, the more quickly measured information is updated, the more accurately output power control is possible.

However, we have discovered that when an existing system for sensing the voltage information of the fuel cell senses data (or information) of all channels (that is, all cells) of the fuel cell and then transmits the sensed data to a controller, the controller selects only required information from the received information and calculates the selected information or transmits the selected information to the upper controller. Thus, time delay occurs in the process of acquiring and transmitting the data (or information) of all the channels (that is, all the cells of the fuel cell), resulting in a reduction in control accuracy.

Furthermore, we have found that since the controller needs to read and calculate all cell values, read time is relatively long and power consumed for communication also increases. As a consequence, it may be difficult to quickly diagnose and take measures for the state of the fuel cell having a relatively large voltage fluctuation, and the fuel cell may be damaged.

SUMMARY

The present disclosure provides an apparatus for sensing voltage information of a fuel cell, which can sense voltage information of all cells and individual cells of a fuel cell required to accurately control the fuel cell, in a time division manner and immediately transmit the sense voltage information to an upper controller, thereby enabling fast power calculation compared to the related art.

Various forms of the present disclosure are directed to an apparatus for sensing voltage information of a fuel cell, which can measure a maximum value, a minimum value, an average value, and a total value of voltage values preset for respective cells of a fuel cell and transmit the measured values to a controller, thereby minimizing the read time and communication power consumption of the cells of the fuel cell.

In one form of the present disclosure, an apparatus for sensing voltage information of a fuel cell includes: a sensing unit configured to sense voltages of each cell and all cells included in a fuel cell; a controller configured to control the sensing unit to sense the voltages of each cell and all the cells of the fuel cell according to a command of an upper controller, or to transmit information of the sensed voltages of each cell and all the cells to the upper controller; and the upper controller configured to detect an error cell by calculating output power of the fuel cell based on the information of the voltages received from the controller, to substantially prevent damage to a surrounding cell by stopping an operation of the error cell, and to control the output power in real time in correspondence with a state of the fuel cell.

In one form of the present disclosure, the controller may sense the information of the voltages of each cell and all the cells of the fuel cell in a time division manner, and transmit the information of the voltages of all the cells to the upper controller upon sensing.

In one form of the present disclosure, as a command AD_CS for sensing the voltage of each cell of the fuel cell is received from the upper controller, the controller may sense and accumulate voltages of a predetermined number of cells every specific period, sense the voltages of the predetermined number of cells, measure output voltages of all the cells, and transmit the output voltages to the upper controller.

In one form of the present disclosure, the number of cells to be measured every specific period may be designated in advance, or included in the command AD_CS for sensing the voltage of each cell.

In one form of the present disclosure, when a cell sensing data read command AD_RD is inputted from the upper controller, the controller may transmit the voltages of cells sensed and accumulated every specific period to the upper controller at once.

In one form of the present disclosure, the sensing unit may be provided in a plural number, and at least one sensing unit may be configured to sense the voltage of each cell and another one sensing unit may be configured to sense the voltages of all the cells, under control of the controller.

In one form of the present disclosure, as the command AD_CS for sensing the voltage of each cell of the fuel cell is inputted from the upper controller, the controller may sense and accumulate the voltage of each cell.

In one form of the present disclosure, as the cell sensing data read command AD_RD is inputted from the upper controller, the controller may transmit the sensed and accumulated voltages of the respective cells to the upper controller at once.

In one form of the present disclosure, as a sensing/read command AD_FC for output voltages for all the cells of the fuel cell is inputted from the upper controller, the controller may sense the output voltages for all the cells of the fuel cell and immediately transmit the output voltages to the upper controller.

In one form of the present disclosure, the sensing/read command AD_FC for the output voltages for all the cells of the fuel cell may be a command for sensing and reading the output voltages for all the cells, and may be aperiodically outputted separately from the command AD_CS for sensing the voltage of each cell of the fuel cell.

In another form, an apparatus for sensing voltage information of a fuel cell includes: a plurality of sensing units each configured to measure voltage values of one or more measurement cells in a fuel cell stack and to detect a diagnosis value for diagnosing the fuel cell stack from the measured voltage values; and a controller configured to receive diagnosis information from the sensing units and to transmit the diagnosis information to an upper controller, wherein each of the sensing units detects the diagnosis values for the respective measurement cells and transmits the diagnosis values to any one of a sensing unit and the controller, which is a transmission target of the diagnosis values, according to a connection relation between the plurality of sensing units, and when diagnosis values are received from another sensing unit, each of the sensing units finally detects a diagnosis value, which is to be transmitted to the transmission target, by using the diagnosis values measured by each of the sensing units and the diagnosis values received from the another sensing unit, and transmits the finally detected diagnosis value to the transmission target.

In one form of the present disclosure, the sensing unit may include: a detection section configured to detect the diagnosis values of the measurement cells from the voltage values of the measurement cells; a storage section configured to store the diagnosis values detected by the detection section; and a control section configured to generate a diagnosis value, which is to be transmitted to the transmission target, by using the diagnosis values stored in the storage section and diagnosis values received from another sensing unit, and to transmit the generated diagnosis value to the transmission target.

In another form, an apparatus for sensing voltage information of a fuel cell includes: a detection section configured to detect diagnosis values of one or more measurement cells in a fuel cell stack from voltage values of the measurement cells; a storage section configured to store the diagnosis values detected by the detection section; and a control section configured to generate diagnosis values, which are to be transmitted to a transmission target, by using the diagnosis values stored in the storage section and diagnosis values received from other sensing units, and to transmit the generated diagnosis values to the transmission target, wherein the control section detects diagnosis values for the respective measurement cells and transmits the diagnosis values to any one of a sensing unit and the controller, which is the transmission target, according to a connection relation therebetween, and when diagnosis values are received from other sensing units, the control section generates diagnosis values, which are to be transmitted to the transmission target, by using the diagnosis values measured by the control section and the diagnosis values received from the another sensing unit, and transmits the generated diagnosis values to the transmission target.

In one form of the present disclosure, the diagnosis values to be transmitted to the transmission target may include at least one of a maximum value and a minimum value of voltage values of all cells in the fuel cell stack, an average value obtained by averaging voltage values of respective cells in the fuel cell stack, a total value obtained by summing the voltage values of all the cells in the fuel cell stack, cell information of cells, in which the maximum value and the minimum value are measured, respectively, among all the cells in the fuel cell stack, and identification information of the sensing unit.

In one form of the present disclosure, the diagnosis values stored in the storage section may include a maximum value and a minimum value of the voltage values of the measurement cells, an average value obtained by averaging the voltage values of the measurement cells, and a total value obtained by summing the voltage values of the measurement cells.

In one form of the present disclosure, for a maximum value and a minimum value of the voltage values of the measurement cells, the control section may match, with each of the maximum value and the minimum value, cell information of a cell, in which each value is measured, respectively, among the measurement cells and identification information of the sensing unit, and transmit the matched information to the transmission target.

In one form of the present disclosure, the control section may compare the maximum value of the voltage values of the measurement cells and the maximum value thereof received from the another sensing unit to transmit a relatively large maximum value to the transmission target, compare the minimum value of the voltage values of the measurement cells and the minimum value thereof received from the another sensing unit to transmit a relatively small minimum value to the transmission target, transmit, to the transmission target, an average value obtained by averaging an average value of the voltage values of the measurement cells and an average value thereof received from the another sensing unit, and transmit, to the transmission target, a total value obtained by summing the voltage values of the measurement cells.

In accordance with one form of the present disclosure, voltage information of all cells and individual cells of a fuel cell required to accurately control the fuel cell is sensed in a time division manner and is immediately transmitted to an upper controller, thereby enabling fast power calculation compared to the related art.

In accordance with one form of the present disclosure, a maximum value, a minimum value, an average value, and a total value of voltage values of preset for respective cells of a fuel cell are measured and transmitted to a controller, thereby minimizing the read time and communication power consumption of the cells of the fuel cell.

In accordance with another form of the present disclosure, it is possible to reduce or minimize damage to a fuel cell having a relatively large voltage fluctuation by enabling fast state diagnosis and measures for the fuel cell.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an exemplary diagram for explaining a method for sensing voltage information of a fuel cell in accordance with the related art;

FIGS. 3A and 3B are exemplary diagrams for explaining methods for sensing voltage information of a fuel cell in one forms of the present disclosure;

FIGS. 4A, 4B, 4C and 4D are exemplary diagrams for comparatively explaining the difference in performance in accordance with the related art and forms of the present disclosure in FIG. 3;

FIG. 6 is an exemplary diagram for explaining a method for disabling the error cell on a circuit in FIG. 5;

FIG. 10 is a diagram conceptually illustrating a method for transmitting a measurement value by a sensing unit in accordance with another form of the present disclosure.

Figure 1:
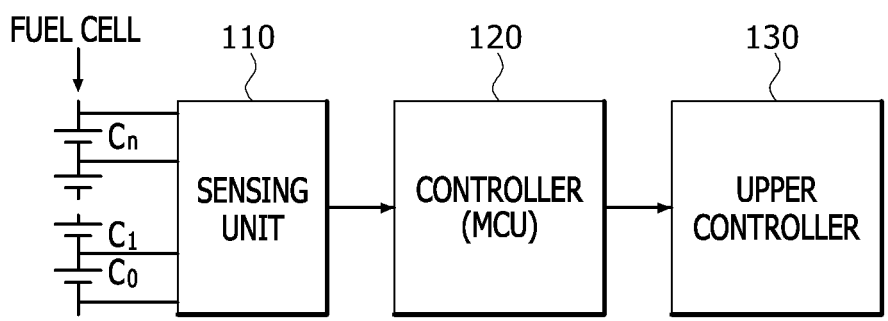
FIG. 1 is an exemplary diagram illustrating a schematic configuration of an apparatus for sensing voltage information of a fuel cell in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, an apparatus for sensing voltage information of a fuel cell in accordance with the present disclosure will be described below with reference to the accompanying drawings.

In this process, the thicknesses of lines or the sizes of elements illustrated in the drawings may be exaggerated for the purpose of clarity and convenience of explanation. Terms to be described later are terms defined in consideration of functions thereof in the present disclosure and may be changed according to the intention of a user or an operator, or practice. Accordingly, such terms should be defined based on the disclosure over the present specification.

FIG. 1 is an exemplary diagram illustrating a schematic configuration of an apparatus for sensing voltage information of a fuel cell in accordance with an form of the present disclosure.

Referring to FIG. 1, the apparatus for sensing voltage information of a fuel cell in accordance with the present form includes a sensing unit 110, a controller 120, and an upper controller 130.

The sensing unit 110 senses voltage or current information of each cell and all cells included in the fuel cell.

The controller 120 controls the sensing unit 110 to sense the voltage or current information of each cell and all the cells of the fuel cell according to a command of the upper controller 130, or transmits the sensed voltage or current information to the upper controller 130.

The upper controller 130 (for example, an ECU and the like of a vehicle) detects an error cell (or an abnormal operation of a cell) by calculating the output power of the fuel cell based on the voltage or current information received from the controller 120, stops an operation of the error cell to substantially prevent damage to a surrounding cell, and controls the output power in real time in correspondence with a state of the fuel cell, through faster power calculation than before.

In general, voltage information actually used for fuel cell control is (1) output voltages of all cells, (2) an average voltage of one cell, and (3) maximum/minimum cell voltages and cell locations. Among them, the most important information for the fuel cell control is (1) the output voltages of all the cells and (2) the average voltage of one cell for calculating the output power of the fuel cell.

For example, when (1) the output voltages of all the cells or (2) the average voltage of one cell is measured, the other item may be extracted through calculation. Thus, it is important to acquire at least one of the information of (1) and (2). In such a case, since the main purpose of average voltage information of each cell is to determine whether a cell is abnormal, there is no significant limitation in a sensing time.

In this regard, in the present form, each channel (that is, an average voltage of one cell or output voltages of all cells) is sensed in a time division manner, thereby improving the control efficiency of output power for the fuel cell. Furthermore, the output voltages of all the cells are sensed and immediately transmitted to the controller 120 or the upper controller 130, thereby enabling realtime calculation of the output power of the fuel cell.

However, since a detailed method in which the upper controller of a vehicle calculates the output power of the fuel cell and detects an error cell (or an abnormal operation of a cell) or an operation for stopping an operation of the error cell may use a method widely known in the technical field of the present disclosure, a detailed description thereof will be omitted.

Hereinafter, a method for sensing voltage information of a fuel cell through the apparatus for sensing voltage information of a fuel cell in accordance with the present form will be described.

FIG. 2 is an exemplary diagram for explaining a method for sensing voltage information of a fuel cell in accordance with the related art. As illustrated in (a) and (b) of FIG. 2, in the related art, when a voltage sensing command AD_CS is inputted from the upper controller 130, the controller 120 controls the sensing unit 110 (or a sensing semiconductor) to sense the voltage of each of cells C1 to Cn (an average voltage of each of the cells C1 to Cn) of the fuel cell, and senses the output voltages of all cells, calculates the voltage of each of the cells C1 to Cn (the average voltage of each of the cells C1 to Cn) and the output voltages of all the cells, and transmits the calculation result to the upper controller 130, so that the upper controller 130 diagnoses an error cell through power calculation and senses a current.

Accordingly, in the related art, time (for example, 20 ms) is required which includes time (for example, 10 ms) required for voltage sensing for all the cells of the fuel cell, time (for example, 5 ms) required for transmitting always sensed voltage information to the controller 120, and time (for example, 5 ms) required for processing (calculating) the sensed voltage information by the controller 120. Accordingly, in the related art, the output voltages of all the cells of the fuel cell are sensed and output power can be controlled only after a considerable time (for example, 20 ms) lapses, thereby reducing the efficiency of power control.

In this regard, in the present form, the efficiency of output power control for a fuel cell is improved through methods for sensing voltage information of a fuel cell, which are illustrated in FIGS. 3A and 3B.

FIGS. 3A and 3B are exemplary diagrams for explaining methods for sensing voltage information of a fuel cell in accordance with first and second forms of the present disclosure.

FIG. 3A is an exemplary diagram for explaining the method for sensing voltage information of a fuel cell in accordance with the first form, and FIG. 3B is an exemplary diagram for explaining the method for sensing voltage information of a fuel cell in accordance with the second form.

Referring to FIG. 3A, the upper controller 130 outputs a command AD_CS for sensing the voltage of each of cells C1 to Cn (an average voltage of each of the cells C1 to Cn) of the fuel cell to the controller 120, and designates the number N of cells to be measured in one period (or once). Then, the controller 120 measures the output voltages of all the cells every one period and transmits the measured output voltages to the upper controller 130.

The number N of cells to be measured in one period (or once) may be designated in advance, or may be included in the command AD_CS for sensing the voltage of each of the cells C1 to Cn (the average voltage of each of the cells C1 to Cn).

For example, as illustrated in FIG. 3A, the controller 120 measures voltages for two cells (N=2) every one period (or once), measures the output voltages of the two cells, and transmits the measured output voltages to the upper controller 130. When a cell sensing data read command AD_RD is inputted from the upper controller 130, the controller 120 transmits the voltage of each of the cells C1 to Cn (the average voltage of each of the cells C1 to Cn) to the upper controller 130 at once.

As illustrated in FIG. 3B, the voltage of each of cells (the average voltage of each of the cells) and the voltages of all the cells (the output voltages of all the cells) may be separately sensed using a plurality of sensing units.

Referring to FIG. 3B, the upper controller 130 outputs a sensing/read command AD_FC for the output voltages for all the cells of a fuel cell (that is, a command for sensing and reading the output voltages for all the cells) to the controller 120, separately from outputting a command AD_CS for sensing the voltage of each of cells C1 to Cn (the average voltage of each of the cells C1 to Cn). As the sensing/read command AD_FC for the output voltages for all the cells is inputted from the upper controller 130, the controller 120 transmits the measured output voltages for all the cells to the upper controller 130. In such a case, the sensing/read command AD_FC for the output voltages for all the cells of the fuel cell may be aperiodically outputted.

In addition, as illustrated in FIG. 3B, as the command AD_CS for sensing the voltage of each of the cells C1 to Cn of the fuel cell (the average voltage of each of the cells C1 to Cn) is inputted from the upper controller 130, the controller 120 senses the voltage of each of the cells C1 to Cn (the average voltage of each of the cells C1 to Cn). Furthermore, as a cell sensing data read command AD_RD is inputted from the upper controller 130, the controller 120 transmits the measured voltage of each of the cells C1 to Cn (average voltage of each of the cells C1 to Cn) to the upper controller 130 at once.

FIGS. 4A, 4B, 4C and 4D are exemplary diagrams for comparatively explaining the difference in performance in accordance with the related art and the some forms of the present disclosure in FIGS. 3A and 3B.

Referring to FIGS. 4A-4B, when an abnormal operation occurs in a fuel cell and actual power (that is, actually outputted power) is suddenly reduced, in the related art, the upper controller 130 recognizes the time point at which the abnormal operation has occurred only after a predetermined time lapses as illustrated in FIG. 4A. However, as illustrated in FIG. 4B, the present form is advantageous in that, immediately after the abnormal operation occurs, the upper controller 130 can recognize the time point at which the abnormal operation has occurred.

Meanwhile, referring to FIGS. 4C-4D, in a case where the abnormal operation occurs in the fuel cell and then immediately the fuel cell is restored to a normal state, for example, when the section in which the abnormal operation has occurred is smaller than time required until the upper controller 130 reads the output voltages for all the cells of the fuel cell, as illustrated in FIG. 4C, the upper controller 130 did not recognize the time point at which the abnormal operation has occurred. However, as illustrated in FIG. 4D, the present form is advantageous in that, immediately after the abnormal operation occurs, the upper controller 130 can recognize the time point at which the abnormal operation has occurred.

As illustrated in FIGS. 4B and 4D, in the present forms, it is possible to detect an abnormal operation of a cell by acquiring a trend line for total power, and to monitor an instantaneous abnormal operation (as in FIG. 4D) as well as a continuous abnormal operation (as in FIG. 4B) attributable to damage to cells. Furthermore, the upper controller 130 can sense the voltage of each of the cells C1 to Cn (the average voltage of each of the cells C1 to Cn), and then detect an abnormal operation (or an error cell) more accurately through comparison with the trend line for the total power.

Figure 5:
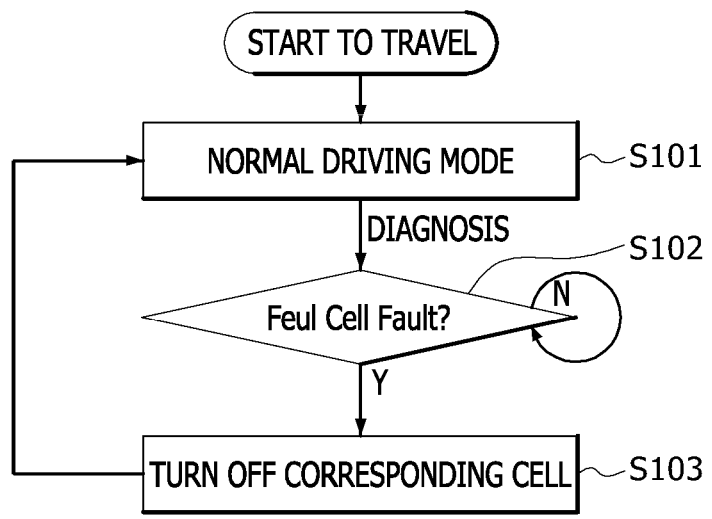
FIG. 5 is an exemplary diagram for explaining a method for disabling an error cell when the error cell is detected in one form of the present disclosure.

FIG. 5 is an exemplary diagram for explaining a method for disabling an error cell when the error cell is detected in accordance with one form of the present disclosure, and FIG. 6 is an exemplary diagram for explaining a method for disabling the error cell on a circuit in FIG. 5.

Referring to FIG. 5, when a vehicle starts to travel, the upper controller 130 continuously diagnoses whether there is an abnormality in each cell of a fuel cell (S102) while the vehicle travels in a normal driving mode (S101), and turns off (or disables) an error cell when the error cell is detected in the fuel cell (S103).

In such a case, in the method for turning off (or disabling) the error cell, as illustrated in FIG. 6, a switch corresponding in parallel to the error cell on the circuit is turned off to form a circuit that contours the error cell through the turned-on switch, thereby turning off (or disabling) the error cell.

As illustrated in FIG. 5 and FIG. 6, in the present form, when an abnormal operation is detected (or an error cell is detected), the upper controller 130 may disable a fault cell (that is, the error cell), thereby substantially preventing damage to surrounding cells to increase a normal driving range and increasing the life of a cell stack.

Figure 7:
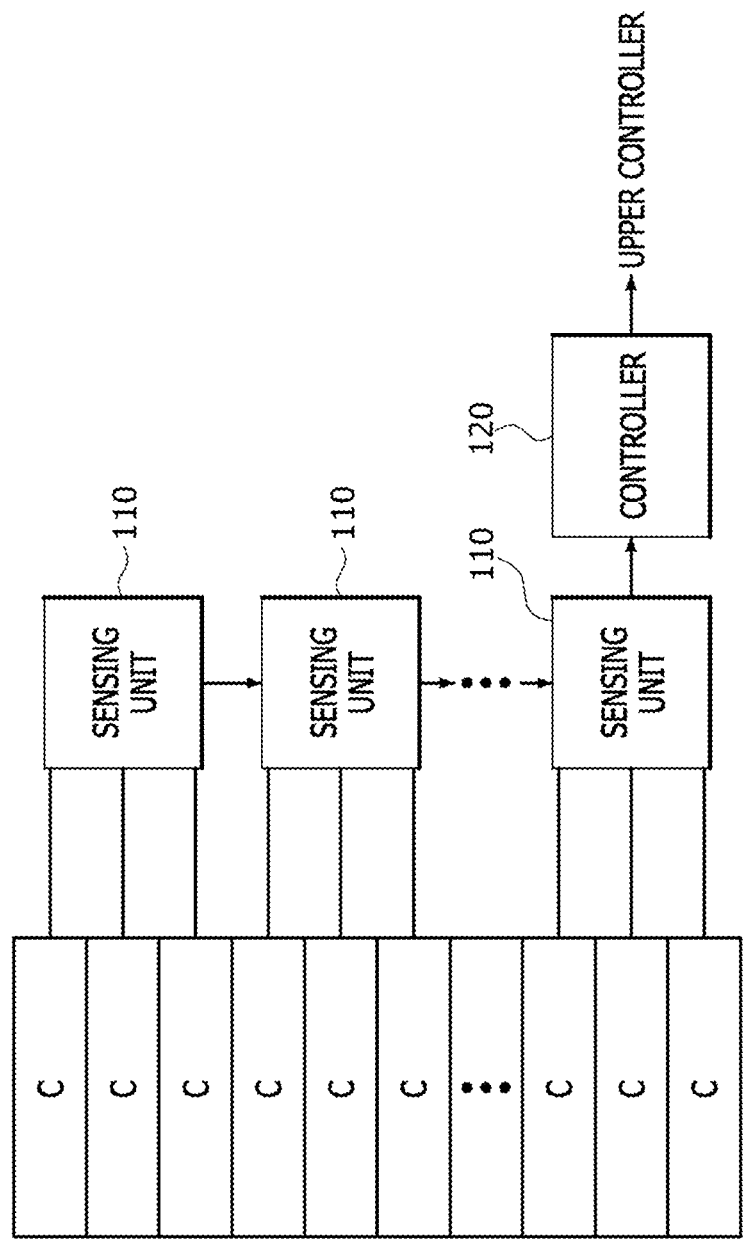
FIG. 7 is a block diagram illustrating a configuration of an apparatus for sensing voltage information of a fuel cell in another form of the present disclosure.
Figure 8:
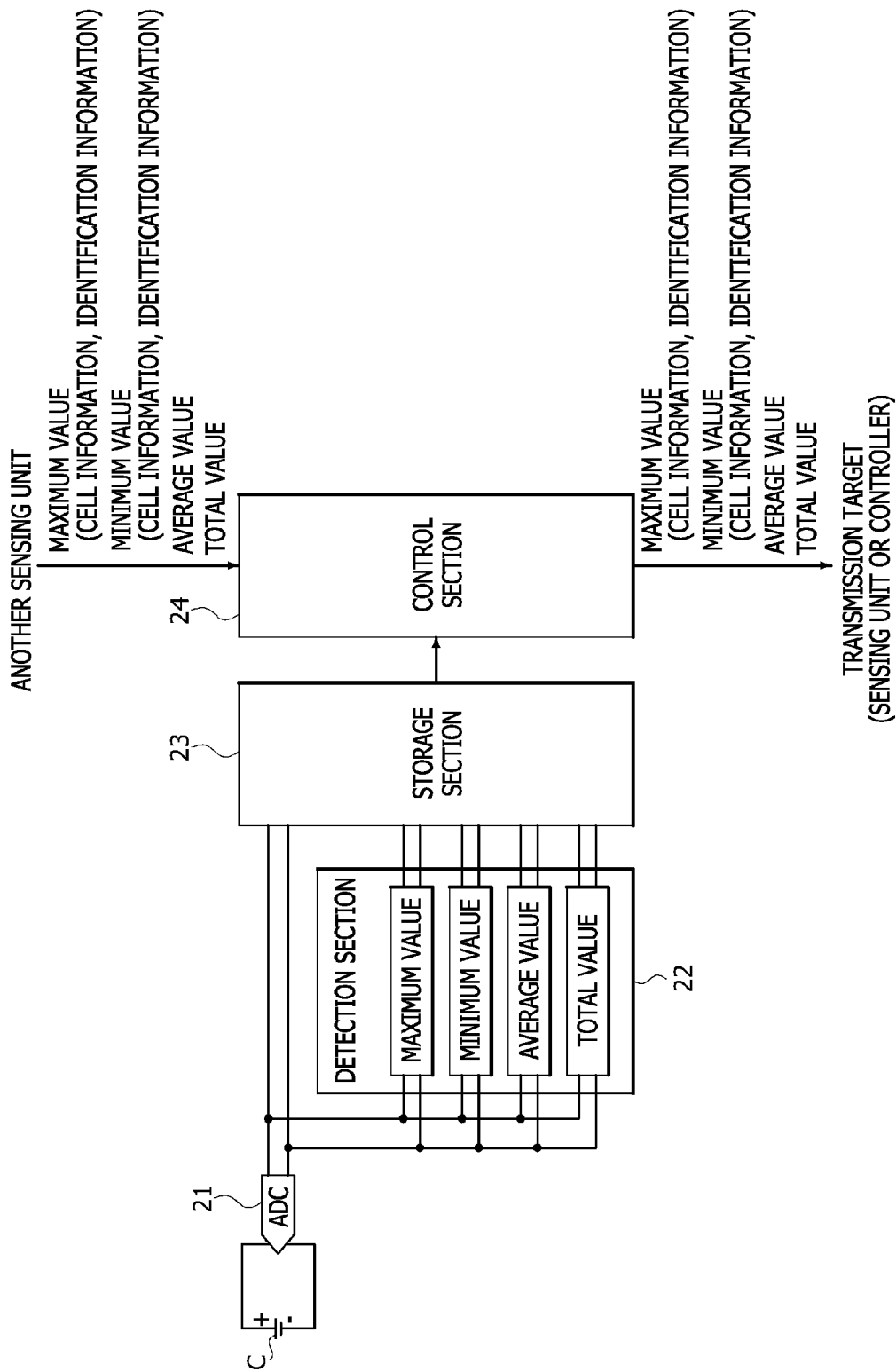
FIG. 8 is a block diagram illustrating a configuration of a sensing unit in another form of the present disclosure.
Figure 9:
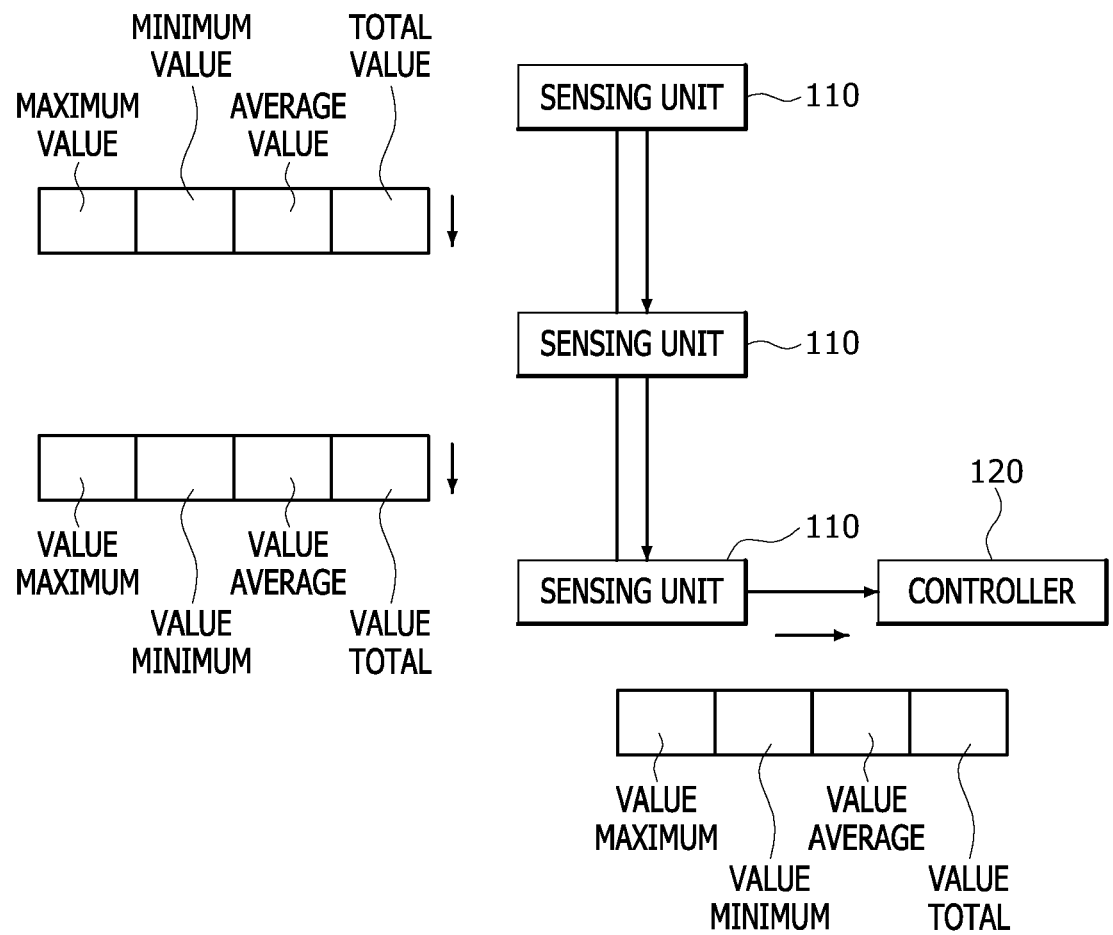
FIG. 9 is a diagram conceptually illustrating a method for measuring a voltage by a sensing unit in another form of the present disclosure.

FIG. 7 is a block diagram illustrating a configuration of an apparatus for sensing voltage information of a fuel cell in accordance with another form of the present disclosure, FIG. 8 is a block diagram illustrating a configuration of a sensing unit in accordance with another form of the present disclosure, FIG. 9 is a diagram conceptually illustrating a method for measuring a voltage by a sensing unit in accordance with another form of the present disclosure, and FIG. 10 is a diagram conceptually illustrating a method for transmitting a measurement value by a sensing unit in accordance with another form of the present disclosure.

Referring to FIG. 7, the apparatus for sensing voltage information of a fuel cell in accordance with another form of the present disclosure includes a sensing unit 110 and a controller 120.

The sensing unit 110 may be installed in a plural number according to the number of cells C in a fuel cell stack.

The sensing unit 110 is connected to one or more cells C in the fuel cell stack, measures voltages of cells to be measured (hereinafter, simply referred to as "measurement cells"), and detects diagnosis values for the fuel cell stack from the measured voltage values.

The diagnosis values are values obtained by measuring the voltages of the respective cells C in the fuel cell stack, and are classified into a self-diagnosis value that is measured by the sensing unit 110 itself, and an output diagnosis value that is generated based on the self-diagnosis value and a self-diagnosis value of another sensing unit 110 received from the another sensing unit 110, and is transmitted to another sensing unit 110 or the controller 120 which is a transmission target of the output diagnosis value. Hereinafter, for convenience of description, the diagnosis values classified into the self-diagnosis value and the output diagnosis value will be described.

The sensing unit 110 is provided in a plural number as described above.

The sensing unit 110 may be connected to another adjacent sensing unit 110 or the controller 120. For example, the sensing units 110 are sequentially connected from a sensing unit 110 of a final node to sensing units 110 of lower nodes, and a sensing unit 110 of the lowermost node is connected to the controller 120.

Each sensing unit 110 detects output diagnosis values for the respective measurement cells C in the fuel cell stack, and transmits the output diagnosis values to any one of a sensing unit 110 and the controller 120, which are transmission targets of the output diagnosis values, according to the aforementioned connection relation.

That is, the sensing unit 110 of the final node transmits self-diagnosis values measured by itself to a sensing unit 110 of the lower node thereof.

Each of the sensing units 110 from a sensing unit 110 under the sensing unit 110 of the final node to the sensing unit 110 of the lowermost node receives output diagnosis values from another adjacent sensing unit 110, newly generates output diagnosis values by using the output diagnosis values received from the another sensing unit 110 and self-diagnosis values, and transmits the newly generated output diagnosis values to the another sensing unit 110 of the lower node thereof. In such a case, the sensing unit 110 of the lowermost node transmits the output diagnosis values to the controller 120.

The sensing unit 110 of the lowermost node receives output diagnosis values from another adjacent sensing unit 110, newly generates output diagnosis values by using the output diagnosis values received from the another sensing unit 110, and self-diagnosis values, and transmits the newly generated output diagnosis values to the controller 120.

Referring to FIG. 8 to FIG. 10, the sensing unit 110 includes an analog-to-digital converter (ADC) 21, a detection section 22, a storage section 23, and a control section 24.

The ADC 21 is connected to one or more cells C in the fuel cell stack and converts the voltages of the respective cells C into digital signals.

A plurality of ADCs 21 may be provided to be connected to the respective cells C or one ADC 21 may be installed to be connected to the plurality of cells C. The number of installed ADCs 21 and the connection method of the ADCs 21 are not limited to the aforementioned forms. In the present forms, an example in which the ADC 21 is connected to one cell C will be described.

The detection section 22 detects self-diagnosis values of measurement cells C from the voltage values converted into the digital signals by the ADC 21.

As described above, the self-diagnosis values are diagnosis values measured by the detection section 22 itself. The detection section 22 is connected to one or more cells C through at least one ADC 21.

The self-diagnosis values include a maximum value and a minimum value of the voltage values of the measurement cells C, an average value obtained by averaging the voltage values of the measurement cells C, and a total value obtained by summing the voltage values of the measurement cells C.

That is, the detection section 22 receives the digital signals from the ADC 21, compares voltage values at the measurement time point of the measurement cells C with each other, and detects the maximum value and the minimum value of the voltage values.

Furthermore, the detection section 22 detects the average value by averaging all the voltage values of the measurement cells C at the measurement time point thereof.

Furthermore, the detection section 22 detects the total value by summing the voltage values measured at the measurement time point thereof.

In such a case, the detection section 22 matches, with each of the maximum value and the minimum value, cell information of a cell, from which each value is detected, and identification information of the sensing unit 110. This is for checking cells C from which the maximum value and the minimum value are detected, respectively, among the cells C connected to the detection section 22.

For example, the detection section 22 is connected to the plurality of measurement cells C as described above to detect the maximum value and the minimum value of the voltage values of the measurement cells C, and matches, with each of the maximum value and the minimum value, the cell information of a cell from which each value is detected, and the identification information of the sensing unit 110.

In such a case, the maximum value and the minimum value may be detected from substantially the same measurement cell C, or may also be detected from measurement cells C different from each other. When the maximum value and the minimum value are detected from measurement cells C different from each other, cell information matching with the maximum value and the minimum value may be different from each other. However, since each cell C may be connected to substantially the same sensing unit 110, the identification information of the sensing unit 110 may be the same even though the cell information is different from each other.

The storage section 23 stores the self-diagnosis values measured by the detection section 22.

The control section 24 controls the detection section 22 to detect self-diagnosis values for the measurement cells C, and transmits the detected self-diagnosis values to any one of another sensing unit 110 and the controller 120, which are transmission targets, according to the connection relation between the sensing units 110.

In such a case, when output diagnosis values are received from another sensing unit 110, the control section 24 newly generates output diagnosis values, which are to be transmitted to a transmission target, by using self-diagnosis values measured by itself and the output diagnosis values received from the another sensing unit 110, and transmits the newly generated output diagnosis values to the transmission target.

That is, the control section 24 reads the self-diagnosis values stored in the storage section 23.

Furthermore, the control section 24 may receive the output diagnosis values from the another sensing unit 110 according to the connection relation described above.

Subsequently, the control section 24 newly detects output diagnosis values, which are to be transmitted to the transmission target, by using the self-diagnosis values and the output diagnosis values.

That is, the control section 24 compares a maximum value of the self-diagnosis values and a maximum value of the output diagnosis values, and transmits a relatively large one (the newly detected output diagnosis value) of the compared maximum values to the transmission target. In such a case, the control section 24 matches, with the maximum value, the cell information of the measurement cell C, from which the maximum value (the newly detected output diagnosis value) is detected, and the identification information of the sensing unit 110.

The control section 24 compares a minimum value of the self-diagnosis values and a minimum value of the output diagnosis values, and transmits a relatively small one (the newly detected output diagnosis value) of the compared minimum values to the transmission target. In such a case, the control section 24 matches, with the maximum value, the cell information of the measurement cell C, from which the minimum value (the newly detected output diagnosis value) is detected, and the identification information of the sensing unit 110.

The control section 24 newly detects an average value (output diagnosis value) by averaging an average value of the self-diagnosis values and an average value of the output diagnosis values.

The control section 24 newly detects a total value (output diagnosis value) by summing a total value of the self-diagnosis values and a total value of the output diagnosis values.

As described above, as the output diagnosis values are detected, the control section 24 transmits the output diagnosis values to another sensing unit 110 or the controller 120, which is a transmission target, according to the connection relation.

As described above, the controller 120 receives the output diagnosis values from the sensing unit 110 of the lowermost node and transmits the output diagnosis values to the upper controller 130.

Meanwhile, the aforementioned process is performed for each sensing unit 110.

Hereinafter, with reference to FIG. 9 and FIG. 10, a process in which the diagnosis values are inputted to the controller 120 will be described. In the present forms, for convenience of description, an example will be described, in which three sensing units 110 are provided and are classified into a sensing unit 110 of the uppermost node, a sensing unit 110 of an intermediate node, and a sensing unit 110 of the lowermost node and the sensing unit 110 of the lowermost node is connected to the controller 120.

An operation of the sensing unit 110 of the uppermost node will be described.

First, the detection section 22 of the sensing unit 110 of the uppermost node detects self-diagnosis values. In such a case, when a plurality of measurement cells C are connected thereto, the detection section 22 may detect self-diagnosis values for respective measurement cells C.

The storage section 23 stores the self-diagnosis values detected by the detection section 22.

When the number of measurement cells C is one, the control section 24 transmits the self-diagnosis value of the measurement cell C to the sensing unit 110 of the intermediate node as an output diagnosis value.

On the other hand, when a plurality of measurement cells C are provided and a plurality of self-diagnosis values are stored for respective measurement cells C, the control section 24 generates output diagnosis values by using the self-diagnosis values detected for the respective measurement cells C, and transmits the generated output diagnosis values to a transmission target.

That is, the control section 24 detects a relatively larger maximum value (output diagnosis value) by comparing maximum values of the self-diagnosis values measured for the respective measurement cells C, matches, with the maximum value, the cell information of the measurement cell C, from which the maximum value is detected, and the identification information of the sensing unit 110, and transmits the matched information to the sensing unit 110 of the intermediate node as an output diagnosis value.

The control section 24 detects a relatively smaller minimum value (output diagnosis value) by comparing minimum values of the self-diagnosis values measured for the respective measurement cells C, matches, with the maximum value, the cell information of the measurement cell C, from which the minimum value is detected, and the identification information of the sensing unit 110, and transmits the matched information to the sensing unit 110 of the intermediate node as an output diagnosis value.

The control section 24 averages average values (output diagnosis values) of the self-diagnosis values measured for the respective measurement cells C, and transmits the average value to the sensing unit 110 of the intermediate node as an output diagnosis value.

The control section 24 sums total values (output diagnosis values) of the self-diagnosis values measured for the respective measurement cells C, and transmits the summed value to the sensing unit 110 of the intermediate node as an output diagnosis value.

Next, an operation of the sensing unit 110 of the intermediate node will be described.

First, the detection section 22 of the sensing unit 110 of the intermediate node detects self-diagnosis values. In such a case, when a plurality of measurement cells C are connected thereto, the detection section 22 may detect self-diagnosis values for the respective measurement cells C.

The storage section 23 stores the self-diagnosis value detected by the detection section 22.

When the number of measurement cells C is one, the control section 24 newly generates an output diagnosis value by using a self-diagnosis value of the measurement cell C and an output diagnosis value received from the sensing unit 110 of the final node, and transmits the output diagnosis value to the sensing unit 110 the lowermost node.

That is, the control section 24 detects a relatively larger maximum value (output diagnosis value) by comparing a maximum value of the self-diagnosis value of the measurement cell C and a maximum value of the output diagnosis value, matches, with the maximum value, the cell information of the measurement cell C, from which the maximum value is detected, and the identification information of the sensing unit 110, and transmits the matched information to the sensing unit 110 of the intermediate node as an output diagnosis value.

The control section 24 detects a relatively smaller minimum value (output diagnosis value) by comparing a minimum value of the self-diagnosis value of the measurement cell C and a minimum value of the output diagnosis value, matches, with the maximum value, the cell information of the measurement cell C, from which the minimum value is detected, and the identification information of the sensing unit 110, and transmits the matched information to the sensing unit 110 of the intermediate node as an output diagnosis value.

The control section 24 generates an average value (output diagnosis value) by averaging an average value of the self-diagnosis values of the measurement cell C and an average value of the output diagnosis values, transmits the average value to the sensing unit 110 of the intermediate node as an output diagnosis value.

The control section 24 generates a total value (output diagnosis value) by summing a total value of the self-diagnosis values of the respective measurement cells C and a total value of the output diagnosis values, and transmits the generated total value to the sensing unit 110 of the intermediate node as an output diagnosis value.

On the other hand, when a plurality of measurement cells C are connected to the sensing unit 110 of the intermediate node and a plurality of self-diagnosis values are stored for the respective measurement cells C, the control section 24 detects a relatively larger maximum value (self-diagnosis value) by comparing maximum values of the self-diagnosis values measured for the respective measurement cells C, and matches, with the maximum value, the cell information of the measurement cell C, from which the maximum value is detected, and the identification information of the sensing unit 110.

The control section 24 detects a relatively smaller minimum value (self-diagnosis value) by comparing minimum values of the self-diagnosis values measured for the respective measurement cells C, and matches, with the minimum value, the cell information of the measurement cell C, from which the minimum value is detected, and the identification information of the sensing unit 110.

The control section 24 newly generates an average value (self-diagnosis value) by averaging average values (self-diagnosis values) of the self-diagnosis values measured for the respective measurement cells.

The control section 24 newly generates a total value (self-diagnosis value) by summing total values (self-diagnosis values) of the self-diagnosis values measured for the respective measurement cells.

Subsequently, the control section 24 newly generates an output diagnosis value by using the self-diagnosis values newly generated as described above and the output diagnosis values received from the sensing unit 110 of the final node, and transmits the generated output diagnosis value to the sensing unit 110 of the lowermost node.

That is, the control section 24 detects a relatively larger maximum value (output diagnosis value) by comparing a maximum value of the newly generated self-diagnosis values and a maximum value of the output diagnosis values, matches, with the maximum value, the cell information of the measurement cell C, from which the maximum value is detected, and the identification information of the sensing unit 110, and transmits the matched information to the sensing unit 110 of the lowermost node as an output diagnosis value.

The control section 24 detects a relatively smaller minimum value (output diagnosis value) by comparing a minimum value of the newly generated self-diagnosis values and a minimum value of the output diagnosis values, matches, with the maximum value, the cell information of the measurement cell C, from which the minimum value is detected, and the identification information of the sensing unit 110, and transmits the matched information to the sensing unit 110 of the lowermost node as an output diagnosis value.

The control section 24 generate an average value (output diagnosis value) by averaging an average value of the newly generated self-diagnosis values and an average value of the output diagnosis values, transmits the average value to the sensing unit 110 of the lowermost node as an output diagnosis value.

The control section 24 generate a total value (output diagnosis value) by summing a total value of the newly generated self-diagnosis values and a total value of the output diagnosis values, and transmits the generated total value to the sensing unit 110 of the lowermost node as an output diagnosis value.

Finally, an operation of the sensing unit 110 of the lowermost node is substantially the same as that of the sensing unit 110 of the intermediate node. However, the lowermost node receives the output diagnosis values from the intermediate node, and transmits finally generated output diagnosis values to the controller 120.

That is, the sensing unit 110 of the lowermost node receives the output diagnosis values from the sensing unit 110 of the intermediate node according to the connection relation between the sensing units 110, finally generates output diagnosis values through the output diagnosis values and self-diagnosis values measured by itself, and transmits the finally generated output diagnosis values to the controller 120. Since the detailed operation processes of such an operation of the sensing unit 110 of the lowermost node are substantially the same as those of the sensing unit 110 of the intermediate node, except for only inputted/outputted information, a detailed description thereof will be omitted.

Although the present disclosure has been described with reference to the forms illustrated in the drawings, the forms of the disclosure are for illustrative purposes only, and those skilled in the art will appreciate that various modifications and other equivalent forms are possible therefrom. Thus, the true technical scope of the present disclosure should be defined by the following claims. Furthermore, the implementations described in the present specification may be implemented with a method or process, an apparatus, and a software program, for example. Although discussed only in the context of a single form of implementation (for example, discussed only as a method), the discussed features may also be implemented as other forms (for example, an apparatus or a program). The apparatus may be implemented with appropriate hardware, software, firmware and the like. The method may be implemented in an apparatus such as a processor generally referring to a processing device including a computer, a microprocessor, an integrated circuit, or a programmable logic device.

What is claimed is:

1. An apparatus for sensing voltage information of a fuel cell, the apparatus comprising:
    a plurality of sensing units each configured to: measure voltage values of a plurality of measurement cells included in a fuel cell stack and detect a diagnosis value for diagnosing the fuel cell stack based on the measured voltage values; and
    a controller configured to receive the diagnosis values from the plurality of sensing units and transmit the diagnosis values to an upper controller,
    wherein each sensing unit of the plurality of sensing units is configured to: detect the diagnosis values for respective measurement cells of the plurality of measurement cells and transmit the diagnosis values to at least one sensing unit of the plurality of sensing units or to the controller, which is a transmission target of the diagnosis values, based on a connection relation between sensing units of the plurality of sensing units, and
    wherein when the diagnosis values are received from another sensing unit among the sensing units, each of the sensing units is configured to finally detect a diagnosis value, which is to be transmitted to the transmission target, using the diagnosis values measured by each of the sensing units and the diagnosis values received from the another sensing unit, and to transmit the finally detected diagnosis value to the transmission target.

2. The apparatus according to claim 1, wherein the sensing units each comprises:
    a detection section configured to detect the diagnosis values of the measurement cells from the voltage values of the measurement cells;
    a storage section configured to store the diagnosis values detected by the detection section; and
    a control section configured to:
    generate a diagnosis value, which is to be transmitted to the transmission target, by using the diagnosis values stored in the storage section and diagnosis values received from the another sensing unit, and
    transmit the generated diagnosis value to the transmission target.

3. An apparatus for sensing voltage information of a fuel cell, the apparatus comprising:
    a detection section configured to detect diagnosis values of measurement cells included in a fuel cell stack based on voltage values of the measurement cells;
    a storage section configured to store the diagnosis values detected by the detection section; and
    a control section configured to:
    generate diagnosis values, which are to be transmitted to a transmission target, using the diagnosis values stored in the storage section and diagnosis values received from a sensing unit, and
    transmit the generated diagnosis values to the transmission target,
    wherein the control section is configured to detect diagnosis values for the respective measurement cells and transmit the diagnosis values to the sensing unit or the controller, which is the transmission target, based on a connection relation therebetween, and
    wherein when the diagnosis values are received from another sensing unit, the control section is configured to: generate diagnosis values, which are to be transmitted to the transmission target, using the diagnosis values measured by the control section and the diagnosis values received from the another sensing unit, and to transmit the generated diagnosis values to the transmission target.

4. The apparatus according to claim 3, wherein the diagnosis values to be transmitted to the transmission target include at least one of a maximum value and a minimum value of voltage values of all of the measurement cells in the fuel cell stack, an average value obtained by averaging voltage values of respective measurement cells in the fuel cell stack, a total value obtained by summing the voltage values of all the measurement cells in the fuel cell stack, cell information of the measurement cells, in which the maximum value and the minimum value are measured, respectively, among all of the measurement cells in the fuel cell stack, and identification information of the sensing unit.

5. The apparatus according to claim 3, wherein the diagnosis values stored in the storage section include a maximum value and a minimum value of the voltage values of the measurement cells, an average value obtained by averaging the voltage values of the measurement cells, and a total value obtained by summing the voltage values of the measurement cells.

6. The apparatus according to claim 3, wherein, for a maximum value and a minimum value of the voltage values of the measurement cells, the control section is configured to:
    match, with each of a maximum value and a minimum value, cell information of a measurement cell, in which each value is measured, among the measurement cells, and
    identification information of the sensing unit, and transmit the matched information to the transmission target.

7. The apparatus according to claim 3, wherein the control section is configured to:
    compare a maximum value of the voltage values of the measurement cells and the a maximum value thereof received from the another sensing unit to transmit a relatively large maximum value to the transmission target,
    compare a minimum value of the voltage values of the measurement cells and a minimum value thereof received from the another sensing unit to transmit a relatively small minimum value to the transmission target, transmit, to the transmission target, an average value obtained by averaging an average value of the voltage values of the measurement cells and an average value received from the another sensing unit, and transmit, to the transmission target, a total value obtained by summing the voltage values of the measurement cells.

* * * * *